United States Patent
Lair

(10) Patent No.: US 7,093,793 B2
(45) Date of Patent: Aug. 22, 2006

(54) VARIABLE CAM EXHAUST NOZZLE

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 197 days.

(21) Appl. No.: 10/899,247

(22) Filed: Jul. 26, 2004

(65) Prior Publication Data

US 2005/0103933 A1    May 19, 2005

Related U.S. Application Data

(60) Provisional application No. 60/498,852, filed on Aug. 29, 2003.

(51) Int. Cl.
*B64B 1/24* (2006.01)

(52) U.S. Cl. .......... 244/53 R; 244/53 B; 60/226.2; 60/226.3; 60/242; 60/771; 239/265.19

(58) Field of Classification Search .......... 60/226.2, 60/226.3, 242, 226.1, 770, 771; 239/265.25, 239/265.27, 265.31, 265.19; 244/53 R, 53 B
See application file for complete search history.

(56) References Cited

U.S. PATENT DOCUMENTS

| 3,779,010 | A |   | 12/1973 | Chamay et al. |
| 3,820,719 | A |   | 6/1974  | Clark |
| 4,922,712 | A |   | 5/1990  | Matta et al. |
| 4,922,713 | A | * | 5/1990  | Barbarin et al. ........... 60/226.2 |
| 5,181,676 | A |   | 1/1993  | Lair |
| 5,221,048 | A |   | 6/1993  | Lair |
| 5,655,360 | A |   | 8/1997  | Butler |
| 5,778,659 | A | * | 7/1998  | Duesler et al. ........... 60/226.1 |
| 5,779,192 | A |   | 7/1998  | Metezeau et al. |
| 5,819,527 | A |   | 10/1998 | Fournier |
| 5,826,823 | A | * | 10/1998 | Lymons et al. ......... 244/110 B |
| 6,070,407 | A | * | 6/2000  | Newton ..................... 60/226.1 |
| 6,101,807 | A | * | 8/2000  | Gonidec et al. ........... 60/226.2 |

OTHER PUBLICATIONS

J. Lair, "Rotary Adjustable Exhaust Nozzle," U.S. Appl. No. 10/838,623; filed May 4, 2004.

* cited by examiner

*Primary Examiner*—J. Woodrow Eldred
(74) *Attorney, Agent, or Firm*—Francis L. Conte

(57) ABSTRACT

An exhaust nozzle includes an exhaust duct with an outlet and a row of radial apertures upstream therefrom. A radial frame surrounds the duct upstream from the apertures. A row of flaps are hinged to the frame to selectively cover and uncover the apertures for controlling exhaust flow discharged therethrough. An arcuate unison bar surrounds the duct adjacent to the frame and includes circumferentially spaced apart cam followers engaging corresponding cams affixed to the flaps. An actuator is joined to the bar for selective rotation thereof between opposite first and second directions to pivot open and closed the flaps atop the apertures.

24 Claims, 6 Drawing Sheets

VARIABLE CAM EXHAUST NOZZLE

This application claims the benefit of U.S. Provisional Application No. 60/498,852; filed Aug. 29, 2003.

BACKGROUND OF THE INVENTION

The present invention relates generally to turbofan aircraft engines, and, more specifically, to exhaust nozzles therefor.

A typical turbofan aircraft engine includes a fan powered by a core engine. The core engine includes a surrounding cowl or nacelle, and the fan includes a corresponding cowl or nacelle at the forward end of the core engine which extends aft either in part or fully thereover.

The fan nacelle is spaced radially outwardly from the core nacelle to define an annular bypass duct therebetween. During operation, the core engine powers the fan which pressurizes ambient air to produce propulsion thrust in the fan air bypassing the core engine and discharged from the fan exhaust nozzle.

A portion of the fan air is channeled into the core engine wherein it is pressurized and mixed with fuel for generating hot combustion gases. Energy is extracted from the combustion gases in high and low pressure turbines which in turn power a compressor and the fan. The core exhaust gases are discharged from the core engine through a core exhaust nozzle and provide additional thrust for propelling the aircraft in flight.

In a typical short fan nacelle, the fan nozzle is spaced upstream from the core nozzle, and the fan exhaust is discharged separately from and surrounding the core exhaust. In a long nacelle, the fan nacelle extends aft of the core nozzle to provide a single common nozzle through which both the fan bypass air and core exhaust are discharged from the engine.

The fan nozzle and the core nozzle are typically fixed area nozzles, although they could be configured as variable area nozzles. Variable area nozzles permit adjustment of the aerodynamic performance of the engine which correspondingly increases complexity, weight, and cost of the nozzle.

Furthermore, turbofan aircraft engines typically include thrust reversers for use in providing braking thrust during landing of the aircraft. Various types of thrust reversers are found in the engine nacelle and further increase complexity, weight, and cost of the engine.

In U.S. Pat. No. 6,751,944; and entitled "Confluent Variable Exhaust Nozzle," assigned to the present assignee, and incorporated herein by reference, an improved variable area exhaust nozzle is disclosed for a turbofan aircraft engine. The confluent nozzle includes outer and inner conduits, with a plurality of flaps therebetween. The flaps may be selectively opened to bypass a portion of exhaust flow from the inner conduit through the outer conduit in confluent exhaust streams from concentric main and auxiliary exhaust outlets.

In this way, the auxiliary outlet may be operated during takeoff operation of the aircraft for temporarily increasing exhaust flow area for correspondingly reducing velocity of the exhaust flow. Noise may therefore be reduced during takeoff operation using a relatively simple and compact variable area configuration.

However, the multiple flaps must be opened and closed in unison, and against the substantial pressure forces generated by the exhaust flow during operation. The actuation system for deploying and retracting the flaps must provide sufficient strength for carrying loads during operation, and must be contained within the available space provided in the nacelle without degrading aerodynamic performance or efficiency of the engine.

Accordingly, it is desired to provide an improved actuation system for deploying and retracting the row of flaps in unison during operation.

BRIEF SUMMARY OF THE INVENTION

An exhaust nozzle includes an exhaust duct with an outlet and a row of radial apertures upstream therefrom. A radial frame surrounds the duct upstream from the apertures. A row of flaps are hinged to the frame to selectively cover and uncover the apertures for controlling exhaust flow discharged therethrough. An arcuate unison bar surrounds the duct adjacent to the frame and includes circumferentially spaced apart cam followers engaging corresponding cams affixed to the flaps. An actuator is joined to the bar for selective rotation thereof between opposite first and second directions to pivot open and closed the flaps atop the apertures.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
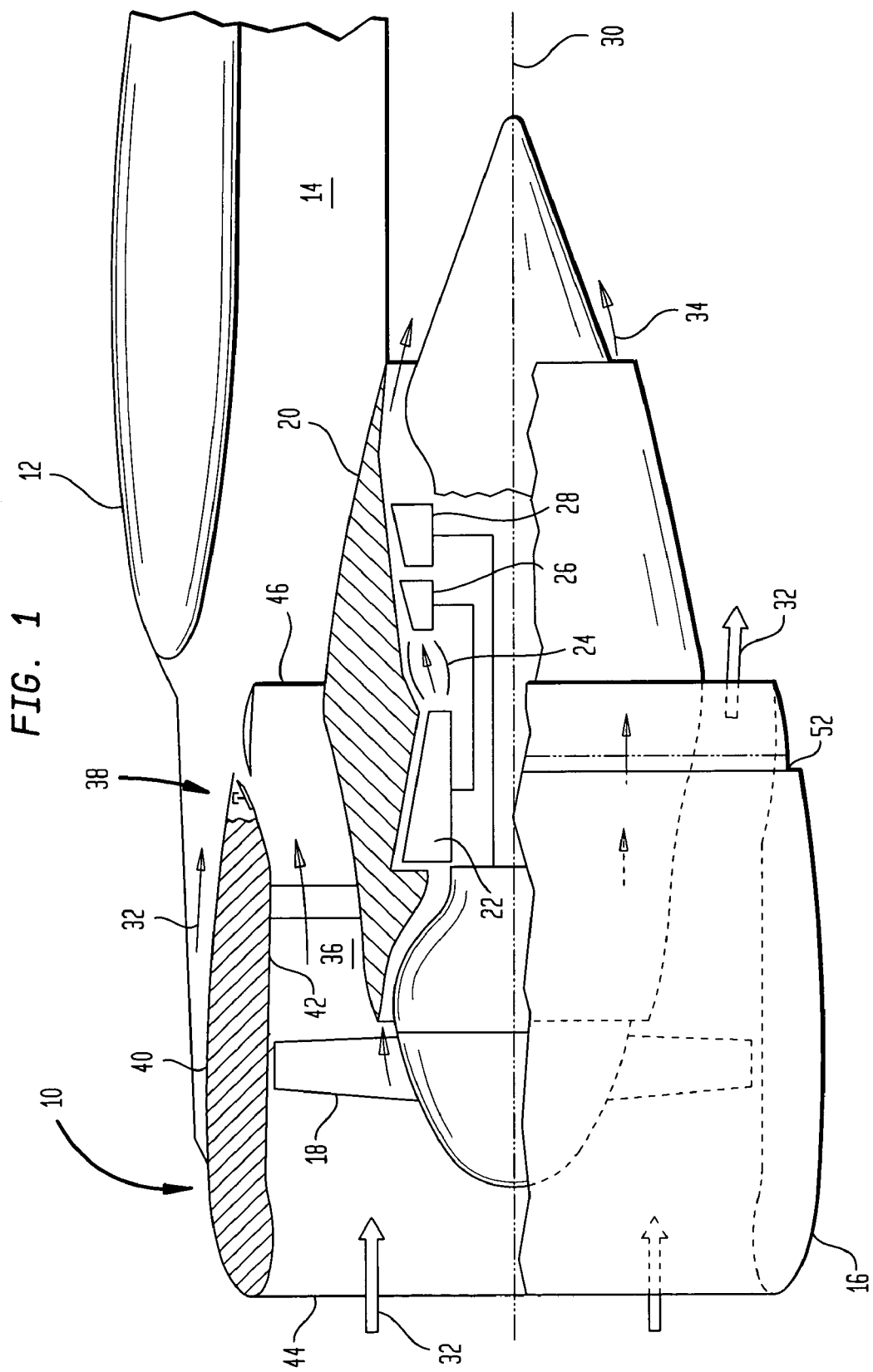
FIG. 1 is a partly sectional axial view of an exemplary turbofan aircraft gas turbine engine mounted to the wing of an aircraft and including a fan exhaust nozzle.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of air is pressurized by the driven fan 18 and bypasses the core engine through a substantially annular bypass duct 36 which terminates in a fan exhaust nozzle 38 for producing a substantial portion of the propulsion thrust which powers the aircraft in flight. The combustion gases 34 are exhausted from the aft outlet of the core engine for providing additional thrust.

The fan nacelle includes radially outer and inner cowlings or skins 40,42 which extend axially from a leading edge of the nacelle defining an annular inlet 44 to an opposite trailing edge defining an annular outlet 46. The fan nacelle may have any conventional configuration, and is typically formed in two generally C-shaped halves which are pivotally joined to the supporting pylon 14 for being opened during maintenance operation.

The exemplary fan nacelle illustrated in FIG. 1 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle by a row of supporting struts in a conventional manner. The core cowl 20 is spaced radially inwardly from the inner skin 42 of the fan nacelle to define the bypass duct 36 therebetween which bypasses the major portion of the fan air around the core engine during operation. The fan bypass duct terminates in the annular, or partly annular fan nozzle 38 at the nacelle trailing edge or outlet 46.

Figure 2:
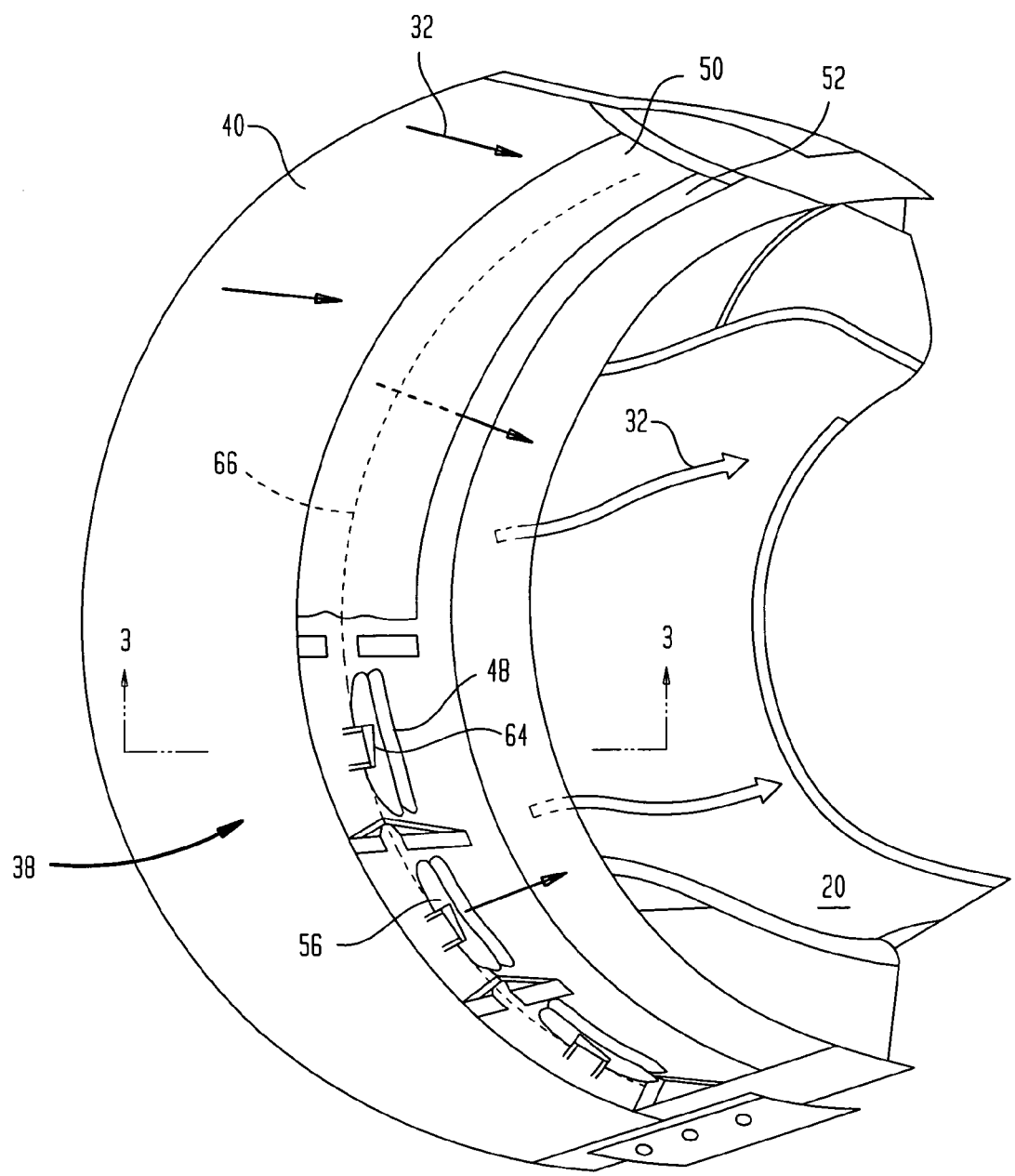
FIG. 2 is an aft-facing-forward isometric view of a portion of the fan nacelle and fan nozzle illustrated in FIG. 1.

The fan nozzle 38 illustrated in FIG. 1 is configured for variable area performance for reducing exhaust noise during aircraft takeoff operation. The variable fan nozzle 38 is illustrated in more detail in FIGS. 2–4 and includes the aft portion of the bypass duct 36 which defines an inner duct within the fan nacelle having the main outlet 46 at the aft end thereof. Spaced upstream from the main outlet 46 is a row of circumferentially spaced apart, radial inlet apertures 48.

An annular outer duct 50 is disposed at the aft end of the fan nacelle coextensive with the outer skin 40 for maintaining an aerodynamically smooth outer mold line (OML) or outer surface of the nacelle having minimal aerodynamic drag. An auxiliary outlet 52 is disposed at the aft end of the outer duct concentric about the fan bypass duct 36.

Figure 3:
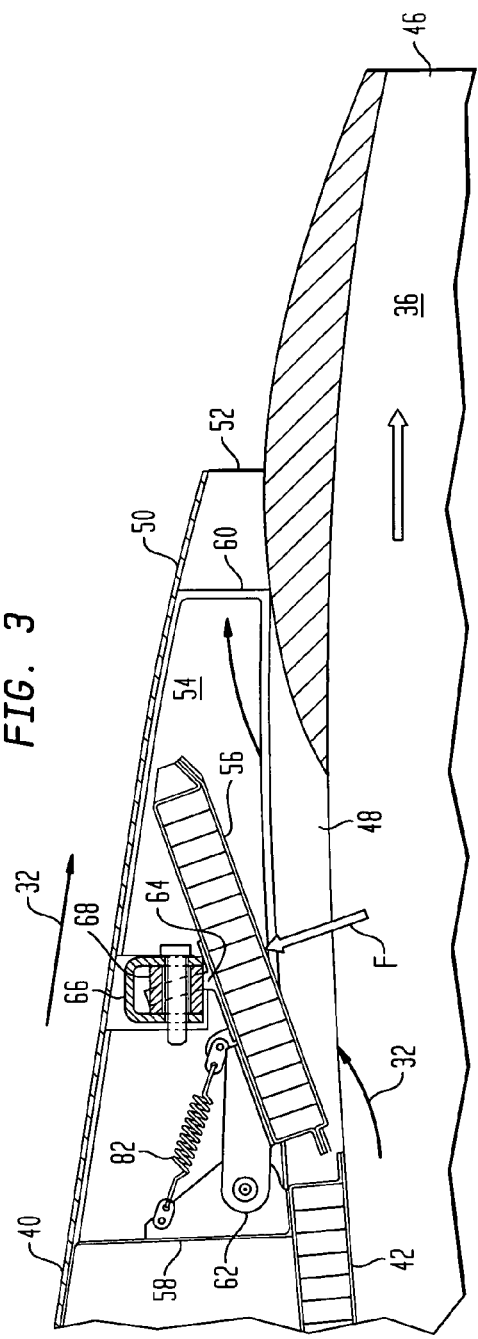
FIG. 3 is a partly sectional axial view through the fan nozzle shown in FIG. 2 and taken along line 3-3, and illustrating one of the flaps opened by a unison bar.
Figure 4:
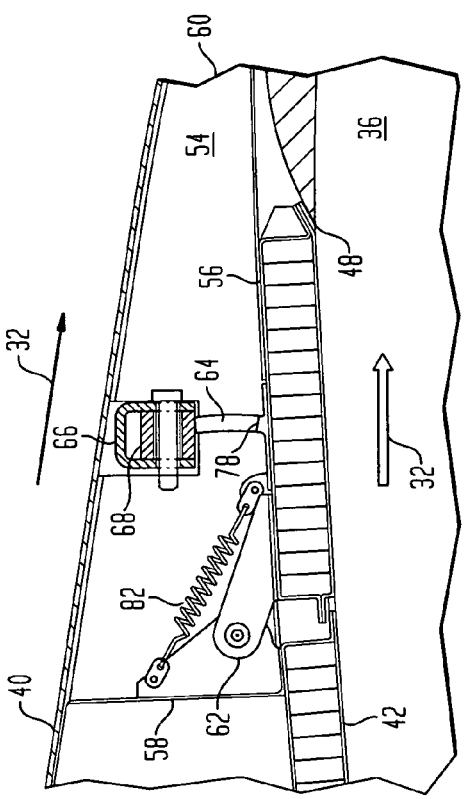
FIG. 4 is a partly sectional axial view, like FIG. 3, of the flap closed by the unison bar.

As shown in FIGS. 3 and 4, the outer duct 50 is spaced radially outwardly from and surrounds the inner duct 36 over the row of apertures 48 to form a bypass channel 54 which begins at the apertures 48 and terminates at the outlet 52. A plurality of doors or flaps 56 are hinged at upstream ends thereof to selectively cover and uncover corresponding ones of the apertures 48 and selectively bypass a portion of the exhaust flow 32 from the inner duct 36 through the outer duct 50 in confluent streams from both the main and auxiliary outlets 46,52.

In this way, the auxiliary outlet 52 provides a temporary increase in the overall discharge flow area for the fan bypass air 32 specifically during takeoff operation of the aircraft. The increased flow area of the main and auxiliary outlets temporarily reduces the velocity of the fan exhaust and therefore reduces the associated noise therefrom.

Furthermore, bypassing a portion of the fan exhaust through the outer duct 50 energizes the ambient airflow 32 outside the nacelle and reduces the thickness of the associated boundary layer. In this way, the external ambient air is locally accelerated in velocity where it meets the higher velocity fan exhaust discharged from the main outlet 46, which in turn reduces the differential velocity and shearing between the two confluent streams for further enhancing noise attenuation.

FIG. 3 illustrates the open flaps 56 for bypassing a portion of the fan exhaust 32 from the inner duct 36 through the outer duct 50 during takeoff operation. FIG. 4 illustrates the flaps 56 closed in their respective apertures 48 after takeoff operation, with the entirety of the fan exhaust 32 being discharged through the inner duct 36 and the main outlet 46 at the aft end thereof.

Figure 5:
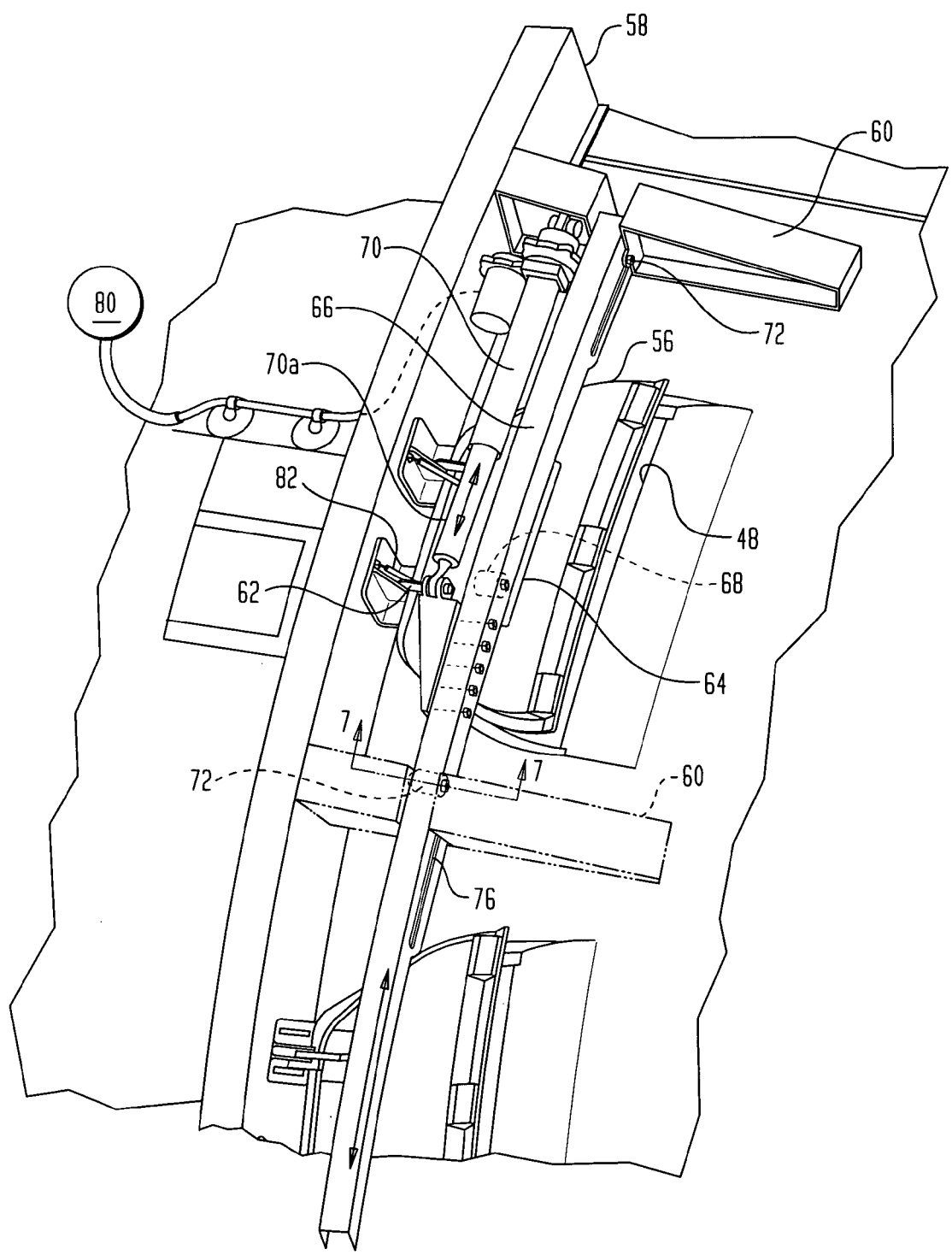
FIG. 5 is an isometric view of the open flaps illustrated in FIG. 3 with a portion of the actuation mechanism therefor.
Figure 6:
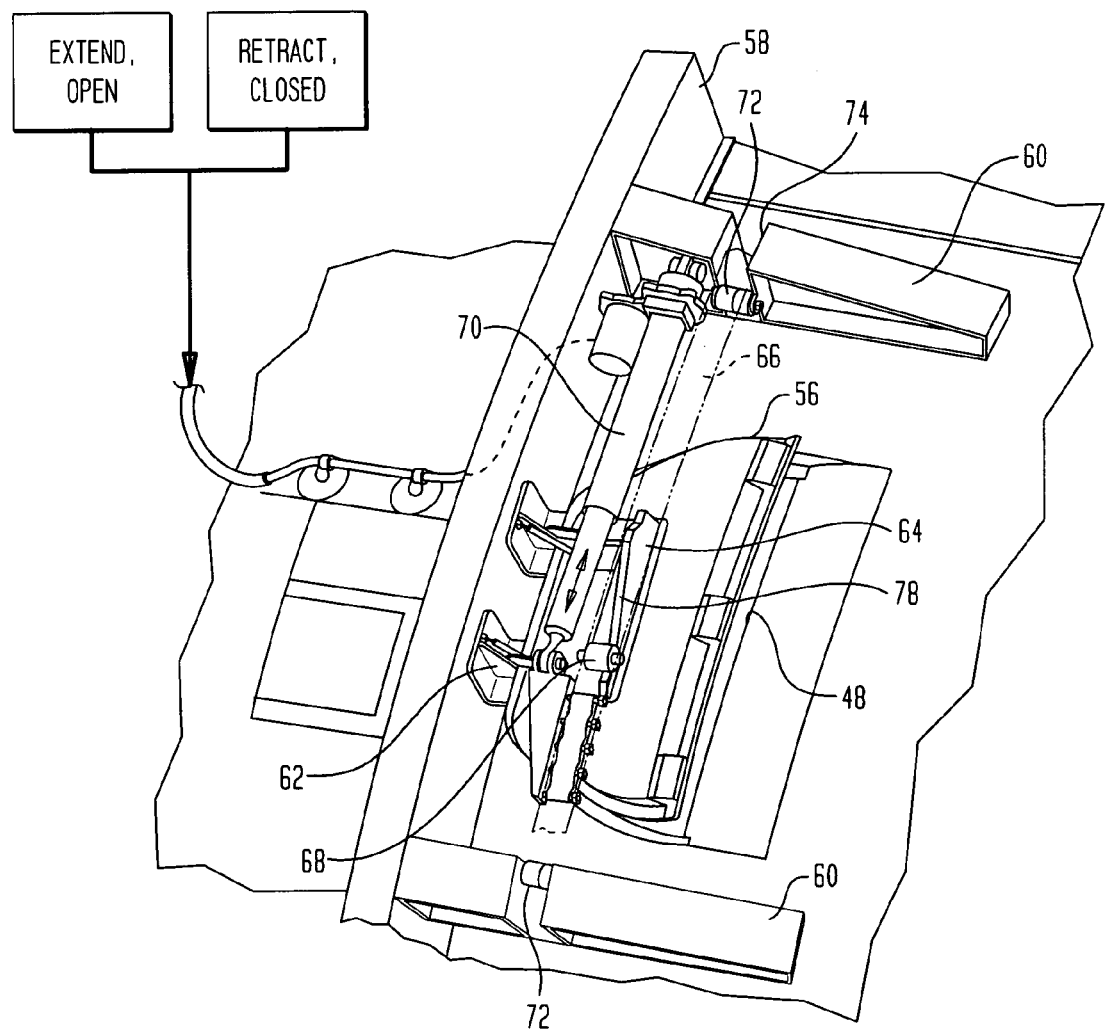
FIG. 6 is an enlarged isometric view of one of the flaps illustrated in FIG. 1 adjacent to the actuator, with the unison bar being removed for clarity.

As illustrated in FIGS. 5 and 6, the fan nozzle preferably includes a radial frame 58 which extends circumferentially between the outer and inner ducts immediately forward of the row of apertures 48. The individual flaps 56 are suitably hinged at their upstream ends to the radial frame 58. A plurality of longitudinal frames 60 extend axially rearwardly from the radial frame, and are disposed circumferentially between corresponding ones of the apertures 48. The longitudinal frames are tapered thinner in the aft direction to match the contour of the outer duct 50 which converges in the aft direction.

The radial and longitudinal frames cooperate together to provide structural support for introduction of the row of apertures 48, while supporting the outer duct 50 and the row of flaps. The longitudinal frames 60 are preferably imperforate to prevent crossflow between the circumferentially adjacent apertures 48 and to confine exhaust flow rearwardly through the corresponding bypass channels 54 disposed between the row of longitudinal frames 60.

As best illustrated in FIG. 6, each of the flaps 56 is pivotally joined at forward ends thereof to the radial frame 58 by a pair of circumferentially spaced hinges 62. The hinges may have any suitable configuration such as devises fixedly mounted to the radial frame and rotatably joined to flanges extending from the outer surface of the flaps, with hinge pins or bolts therebetween.

In order to open and close the row of flaps 56 illustrated in FIGS. 3–5, each flap includes a cam 64 extending radially outwardly from the outer surface thereof and suitably affixed thereto. An arcuate unison or drive bar 66 is mounted circumferentially around the bypass duct 36 adjacent to the radial frame 58.

The unison bar 66 includes a plurality of cam followers or rollers 68 spaced circumferentially apart in rolling engagement with the corresponding ones of the cams 64 affixed to the individual flaps 56. The cam followers 68 are preferably mounted inside the unison bar 66 as illustrated in FIGS. 3–5, with FIG. 6 illustrating an exemplary one of the cam followers abutting the corresponding cam 64, with the unison bar being removed for clarity of presentation.

A suitable linear actuator 70 is joined to the unison bar 66 for selectively rotating the bar in a first counterclockwise direction aft-facing-forward as shown in FIG. 5 to pivot open the row of flaps 56 as shown in FIG. 3, and in an opposite, second, clockwise direction to pivot closed the flaps to cover and seal shut the row of radial apertures 48 as shown in FIG. 4. In this way, the common unison bar 66 may be used to selectively open and close the full row of flaps 56 and selectively permit an increase in discharge flow area as a portion of the air 32 initially carried in the large bypass duct is diverted therefrom through the small bypass channel 54 and out the auxiliary outlet 52 when desired.

Particular advantages of the actuation mechanism for opening and closing the flaps are its mechanical simplicity, mechanical efficiency, lower actuation force, few parts, and low weight which are all desirable in an aircraft engine. A separate unison bar and actuator may be provided for each half of the engine to correspond with the C-ducts thereof.

Each unison bar is mounted around the bypass duct 36 by a plurality of guide rollers 72 spaced circumferentially apart and suitably fixedly attached to corresponding ones of the longitudinal frames 60. The unison bars are thusly securely attached to the longitudinal frames, with limited circumferential movement provided by the guide rollers.

Figure 7:
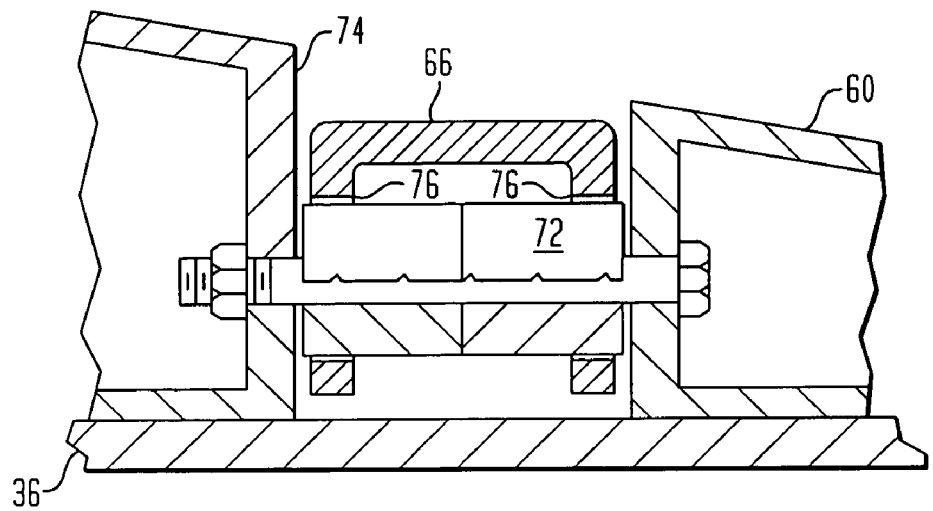
FIG. 7 is an axial transverse sectional view through the unison bar illustrated in FIG. 5 and taken along line 7-7.

As shown in FIG. 6, the longitudinal frames 60 extend aft from the common radial frame 58 on opposite circumferential sides of the flaps 56 and include suitable radial notches 74 therein in which the individual guide rollers 72 are fixedly mounted as best illustrated in FIG. 7. The guide rollers 72 may have any suitable form, and may include a center fastening bolt to mount the guide roller across the axial extent of the notch 74, which notch in turn receives a corresponding portion of the unison bar 66.

The unison bar 66 as illustrated in FIGS. 5 and 7 includes a plurality of circumferential tracks or slots 76 extending axially therethrough which receive corresponding ones of the guide rollers 72 to permit limited circumferential rotation of the unison bar with radial retention thereof. The unison bar as illustrated in FIG. 5 is trapped axially and radially in the corresponding longitudinal frames 60, and the slots 76 permit limited rotary movement of the unison bar as it rolls along the guide rollers 72 fixedly mounted to the longitudinal frames.

The unison bar 66 illustrated in FIG. 7 has a generally U-shaped axially transverse cross section with two radial legs joined to an axial cross member or base. This configuration provides substantial strength and rigidity to the unison bar with low weight. Each of the legs includes a matching circumferential slot 76 which together receive the guide rollers 72 therein that extend axially across the legs.

As best illustrated in FIG. 4, each of the cam followers 68 also extends axially between the two legs of the unison bar 66, with a center fastening bolt rotatably mounting the cam follower to the opposite legs of the unison bar.

As shown in FIG. 5, each cam follower 68 is mounted in the common unison bar 66 circumferentially between a pair of the guide rollers 72. The guide rollers in turn are mounted to the corresponding longitudinal frames 60. In this way, the reaction loads between the unison bar 66 and the corresponding flaps 56 are distributed equally between the two longitudinal frames 60 for more efficiently opening and closing the flaps with minimal force.

Figure 8:
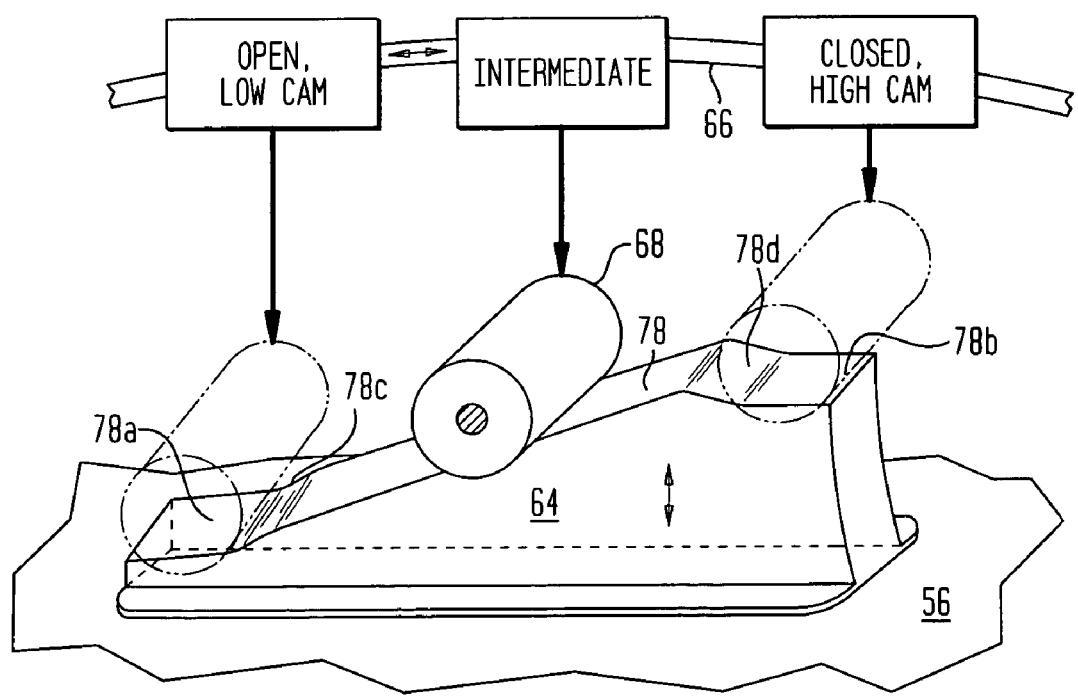
FIG. 8 is a isometric view of the deployment cam illustrated in FIGS. 3, 4, and 6 in a preferred embodiment.

As initially illustrated in FIG. 6, each of the cams 64 includes a radially outer land or ramp 78 which extends circumferentially along the outer surface of each flap 56. As best illustrated in FIG. 8, the outer ramp 78 varies in radial height from low to high. The low cam height is defined by a low step or land 78a at the base of the ramp 78, and the high cam height is defined at a high step or land 78b at the opposite top end of the ramp 78.

When the unison bar 66 is driven counterclockwise by the actuator to position the cam followers 68 on the low cam step 78a, the corresponding flaps 56 are permitted to pivot radially outwardly into their open positions as shown in FIG. 3. Since the fan bypass air 32 being channeled through the fan duct 36 is pressurized, it develops a pressure force F over the inner surface of the flaps 56 which pushes the flaps radially outwardly as the cam followers 68 are driven towards the low cam steps 78a.

Correspondingly, when the unison bar 66 is rotated clockwise in FIG. 8 by the actuator, the cam followers 68 are driven along the ramp 78 to the high cam step 78b which pushes radially inwardly the corresponding flaps to their closed positions sealing shut the radial apertures 48.

Furthermore, the unison bar 66 may be driven to position the cam followers 68 at any intermediate position between the low and high steps 78a,b, which in turn positions the flaps 56 to the corresponding intermediate positions between the open position illustrated in FIG. 3 and the closed position illustrated in FIG. 4. Variable area performance of the fan nozzle may be effected in this manner.

The ramp 78 illustrated in FIG. 8 may have any suitable slope between the low and high steps for corresponding positioning the flaps between their open and closed positions. For example, each of the cams 64 may also include an up-step 78c between the level low step 78a and the commencement of the rise in the ram 78 in which an initially higher inclination or slope is effected. This up-step 78c provides an effective locking mechanism for locking the flaps in their open positions since the actuator must initially provide a temporary increase in force to drive the cam follower over the up-step upon closing each flap.

Correspondingly, each ramp 78 preferably also includes a down-step 78d at the top of the ramp where it joins the level high step 78b with an abrupt decrease in slope or decline from the inclined ramp 78. In this way, the actuator must again develop a temporary increase in force to drive the cam follower 68 up and over the down-step 78d, which is now an up-step in reverse movement, as the flap 56 is permitted to open from its closed position.

The down-step 78d provides an effective locking mechanism to keep the individual flaps stowed in their closed positions as illustrated in FIG. 4. In order to open the flaps, the cam follower is driven over the down-step 78d which requires initially superclosing the flaps 56 which must be driven slightly further radially inwardly against the elastic restraint of a suitable perimeter seal provided between each flap and its seat around the radial aperture 48.

FIGS. 3 and 4 illustrate the relative position of the radially extending cam 64 as it pivots with the corresponding flaps 56 between their open and closed positions. Since the flaps 56 pivot around their mounting hinges 62, each of the cams 64 moves both radially outwardly and axially forwardly as the flap moves from the closed to open positions.

Since the cam followers 68 are attached to the supported unison bar 66, their axial orientation remains constant as the cam 64 pivots during opening and closing of the flaps.

Accordingly, the ramp 78 as illustrated in FIGS. 3, 4, and 8 preferably twists between the low cam step 78a and the high cam step 78b to maintain the surface of the ramp 78 substantially parallel with the cam followers 68 as the flaps pivot between the open and closed positions. In the open position illustrated in FIG. 3, the low height step of the ramp is parallel with the abutting cam follower 68; and in the closed position of the flap 56 illustrated in FIG. 4 the high cam step of the ramp is also parallel with the cam follower 68 notwithstanding the difference in angular orientation of the cam as it pivots in space between the open and closed positions.

By suitably twisting the ramp 78 between the low and high steps, the ramp may at all times remain parallel with the cam follower 68 as it rolls therealong during pivoting of the flaps between their fully open and fully closed positions.

This will ensure uniform wear between the ramp of the cam and individual cam followers 68 without locally concentrated loads therebetween.

FIGS. 3 and 4 also illustrate the axial movement of the cam 64 as it pivots radially outwardly with the flap between the closed and open positions. Accordingly, each of the cams 64 is preferably arcuate in transverse section in the axial plane illustrated in FIGS. 3 and 4 and is generally concave forwardly and convex in the aft direction. This transverse curvature of the cam minimizes the differential axial movement between the ramp 78 and the corresponding cam follower 68 as the flaps pivot between their open and closed positions. This in turn reduces the axial length of the cam followers 68, and in turn the axial width of the unison bar 66.

The actuator 70 illustrated in FIG. 5 is preferably joined to a proximal end of the unison bar 66 and is substantially parallel therewith for selectively rotating the bar clockwise or counterclockwise as desired. A single actuator 70 may be used for each unison bar 66 on each half of the engine.

The actuator may have any conventional configuration such as pneumatic, hydraulic, or electrical, and in the exemplary embodiment illustrated in FIG. 5 is an electrical actuator suitably joined to an electrical power supply 80 for temporary operation when required during deployment or attraction of the bypass flaps 56. The actuator 70 includes an output screw or rod 70a which is suitably joined in parallel with the circumferentially extending unison bar 66 by a mounting bracket fixedly joined thereto.

In this way, the actuator may be electrically driven to extend the output rod 70a to rotate the unison bar in the first or counterclockwise direction to permit the flaps to open, and to retract the output rod to rotate the unison bar in the second or clockwise direction for closing the flaps.

As indicated above with respect to FIG. 3, the internal pressure forces F developed along the inner surface of the flap 56 may be used for driving open each flap as the cam follower 68 is driven by the unison bar toward the low step of the cam. Conversely, the actuator 70 must develop sufficient force for driving the cam follower 68 to force the cam 64 radially inwardly as the follower rides along the ramp to the high step 78b portion thereof to close the flap.

In the exemplary embodiment illustrated in FIGS. 3 and 4, a plurality of tension springs 82 may be mounted between respective ones of the flaps 56, at each of their two hinges for example, and the radial frame 58 to pull the flaps radially outwardly. In this way, the flaps may be open by the tension force developed in the springs 82 upon rotation of the unison bar independently of the pressure forces F developed during operation of the engine.

The common unison bar 66 disclosed above provides an efficient mechanism for simultaneously opening and closing the flaps when desired. The unison bar 66 is conveniently mounted by the guide rollers 72 and the corresponding longitudinal frames 60. The cam followers 68 are conveniently mounted in the same unison bar in position over respective cams 64. And, simple rotation of the unison bar permits the simultaneous deployment of the full row of flaps to their open positions and retraction to their closed positions.

The flaps may be temporarily opened during takeoff operation of the engine for increasing the effective discharge flow area in the fan nozzle by the added flow area of the auxiliary outlet 52 to that of the main outlet 46. The increased flow area permits a corresponding reduction in velocity of the fan air being discharged, which in turn reduces noise therefrom. And, the flaps may be driven to intermediate positions between their open and closed positions for obtaining variable area operation of the fan nozzle for enhancing performance of the engine as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A gas turbine engine exhaust nozzle comprising:
an exhaust duct having an outlet at an aft end thereof for discharging exhaust flow, and including a row of radial apertures spaced upstream from said outlet;
a radial frame extending circumferentially around said duct and spaced forward from said apertures;
a plurality of flaps hinged at upstream ends thereof to said frame to selectively cover and uncover said apertures for controlling exhaust flow discharge therethrough, and each flap including a cam extending radially outwardly therefrom for radial and axial movement therewith as said flap pivots;
an arcuate unison bar mounted circumferentially around said duct adjacent to said frame, and including a plurality of cam followers spaced circumferentially apart in radial engagement with corresponding ones of said cams affixed to said flaps; and
an actuator joined to said bar for selectively rotating said bar in a first direction to pivot open said flaps, and in an opposite second direction to pivot closed said flaps to cover said apertures.

2. A nozzle according to claim 1 wherein each of said cams comprises a ramp extending circumferentially along said flap, and varies in radial height from low to high, with low cam height permitting said flaps to pivot open radially outwardly, and high cam height pivoting closed said flaps radially inwardly.

3. A nozzle according to claim 2 wherein said unison bar is mounted to said duct by a plurality of guide rollers spaced circumferentially apart.

4. A nozzle according to claim 3 wherein said ramp twists between said low and high cam heights to maintain said ramp parallel with said cam follower as said flaps pivot between open and closed positions.

5. A nozzle according to claim 4 wherein each of said cams is arcuate in section between said flap and ramp to minimize differential axial movement between said ramp and corresponding cam follower.

6. A nozzle according to claim 3 wherein said cams include an up-step at the base of said ramp at said low cam height, and a down-step at the top of said ramp at said high cam height.

7. A nozzle according to claim 3 wherein said cam follower is mounted in said unison bar circumferentially between a pair of said guide rollers.

8. A nozzle according to claim 7 further comprising a plurality of longitudinal frames extending aft from said radial frame on opposite circumferential sides of corresponding ones of said flaps, and said guide rollers are mounted to said longitudinal frames.

9. A nozzle according to claim 8 wherein said unison bar includes a plurality of circumferential slots extending axially therethrough receiving corresponding ones of said guide rollers to permit circumferential rotation of said unison bar with radial retention.

10. A nozzle according to claim 9 wherein said unison bar includes a U-shaped cross section having two legs, and said guide rollers and said cam follower extend axially across said legs.

11. A nozzle according to claim 3 wherein said actuator is joined to a proximal end of said bar and is substantially parallel therewith for rotation thereof.

12. A nozzle according to claim 3 wherein said actuator includes an output rod joined in parallel with said unison bar, and is configured to extend said rod to rotate said bar in said first direction, and to retract said rod to rotate said bar in said second direction.

13. A nozzle according to claim 3 further comprising a plurality of springs mounted between respective ones of said flaps and radial frame to pull said flaps radially outwardly.

14. A nozzle according to claim 3 further comprising an outer duct surrounding said exhaust duct to form a bypass channel extending aft from said apertures and terminating at an auxiliary outlet.

15. A gas turbine engine exhaust nozzle comprising:
   an exhaust duct having an outlet at an aft end thereof for discharging exhaust flow, and including a row of radial apertures spaced upstream from said outlet;
   a radial frame extending circumferentially around said duct and spaced forward from said apertures;
   a plurality of flaps each pivotally joined to said radial frame by a pair of hinges to selectively cover and uncover said apertures for controlling exhaust flow discharge therethrough, and each flap including a cam extending radially outwardly therefrom for radial and axial movement therewith as said flap pivots;
   an arcuate unison bar mounted circumferentially around said duct adjacent to said frame, and including a plurality of cam rollers spaced circumferentially apart in radial engagement with corresponding ones of said cams affixed to said flaps; and
   an actuator joined to said bar for selectively rotating said bar in a first direction to pivot open said flaps, and in an opposite second direction to pivot closed said flaps to cover said apertures.

16. A nozzle according to claim 15 wherein said actuator includes an output rod joined in parallel with said unison bar, and is configured to extend said rod to rotate said bar in said first direction, and to retract said rod to rotate said bar in said second direction.

17. A nozzle according to claim 16 wherein:
   said unison bar is mounted to said duct by a plurality of guide rollers spaced circumferentially apart; and
   said unison bar includes a U-shaped cross section having two legs, and said guide rollers and said cam rollers extend axially across said legs.

18. A nozzle according to claim 17 wherein each of said cams comprises a ramp extending circumferentially along said flap, and varies in radial height from low to high, with low cam height permitting said flaps to pivot open radially outwardly, and high cam height pivoting closed said flaps radially inwardly.

19. A nozzle according to claim 18 wherein said cams include an up-step at the base of said ramp at said low cam height, and a down-step at the top of said ramp at said high cam height.

20. A nozzle according to claim 19 further comprising a plurality of longitudinal frames extending aft from said radial frame on opposite circumferential sides of corresponding ones of said flaps, and said guide rollers are mounted to said longitudinal frames.

21. A nozzle according to claim 20 wherein said unison bar includes a plurality of circumferential slots extending axially therethrough receiving corresponding ones of said guide rollers to permit circumferential rotation of said unison bar with radial retention.

22. A nozzle according to claim 21 wherein said ramp twists between said low and high cam heights to maintain said ramp parallel with said cam roller as said flaps pivot between open and closed positions.

23. A nozzle according to claim 22 wherein each of said cams is arcuate in section between said flap and ramp to minimize differential axial movement between said ramp and corresponding cam roller.

24. A nozzle according to claim 23 further comprising a plurality of springs mounted between respective ones of said flaps and radial frame to pull said flaps radially outwardly.

* * * * *